Oct. 31, 1961 W. V. TYRLICK 3,007,136
NON-RESETTING ALLOTTER DEVICE
Filed April 13, 1959 2 Sheets-Sheet 1

INVENTOR.
WILLIAM V. TYRLICK
BY
Richard G. Stahr
ATTORNEY

INVENTOR.
WILLIAM V. TYRLICK

BY Richard G. Stahr
ATTORNEY

United States Patent Office 3,007,136

Patented Oct. 31, 1961

3,007,136
NON-RESETTING ALLOTTER DEVICE

William V. Tyrlick, Rochester, N.Y., assignor to General Dynamics Corporation, Rochester, N.Y., a corporation of Delaware Filed Apr. 13, 1959, Ser. No. 805,967
6 Claims. (Cl. 340—147)

Figure 1:
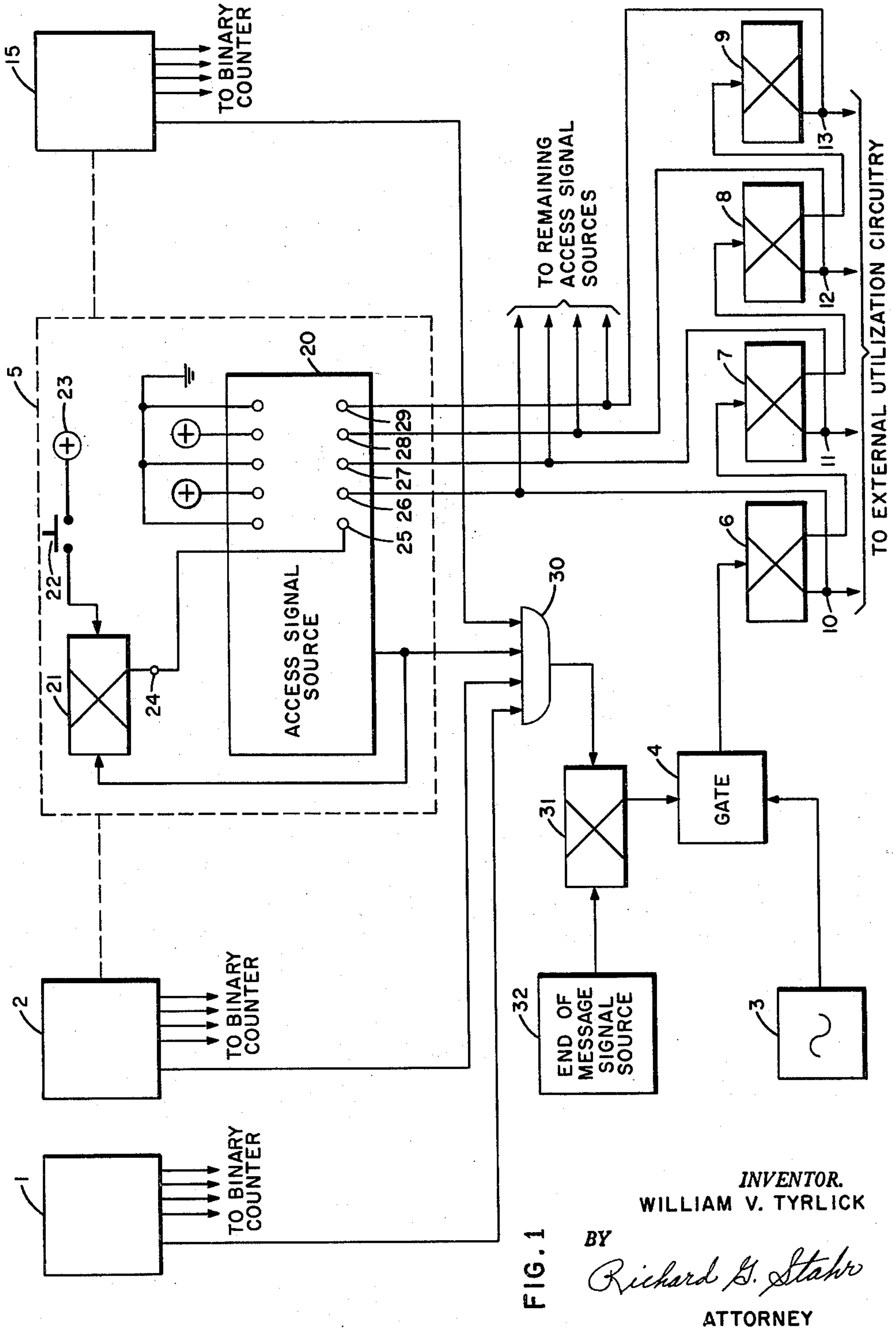

The present invention relates to allotter devices and, more specifically, to an electronic allotter device of the non-resetting type.

In systems which are employed for the purpose of switching or distributing electrical signals throughout a complex network, it is frequently necessary that any one of a plurality of circuits be individually connected to a single common circuit.

This requirement is particularly applicable in the field of communications, both wired and radiant, where messages may originate in any one of many different sources and each must be connected to a transmitter device which is common to all. As only one of the originating circuits may be connected to the common equiment at a time, an allotter circuit is required for the purpose of interconnecting each of the originating devices separately with the common circuitry, usually successively.

In prior art devices, particularly in the telecommunications field, these allotter devices have been of the resetting type or mechanical in operation. That is, at the conclusion of the interval of time during which any one of the originating circuits is connected to the common circuitry, the allotter device resets to its original condition where it remains inoperative until another one of the originating stations is to be connected to the common circuitry. Although devices of this type work satisfactorily during off-peak periods, because of the resetting feature, only those originating circuits which are interrogated first by the allotter device may be connected to the common circuitry during periods of peak traffic.

In view of this, it is an object of this invention to provide an improved allotter device.

It is another object of this invention to provide an improved allotter device of the non-resetting type.

It is another object of this invention to provide a non-resetting electronic allotter device which repetitively interrogates each one of a plurality of originating stations which may allot any one of the originating stations to the common circuitry first regardless of its position relative to the alloter device.

In accordance with this invention, there is provided a non-resetting allotter device of the type which selects, in response to the presence of one or more access signals, the next one of a plurality of signal sources, each one of which is identified by a binary code group representation peculiar thereto, which may be connected individually to a common utilization circuit by producing the binary code group representation signals peculiar to the selected one through the medium of cyclically producing the binary code group representation signals of all of the signal sources wherein the representation signals of each source occur individually once during each cycle. As any one of the signal sources is to be connected to a common utilization circuit, an access signal is produced therein which stops the cycle of binary code group representations during that portion of the cycle during which the binary code group representation of that signal source is being produced thereupon providing for the reading out from output circuits the binary code group representation of that signal source.

Figure 2:
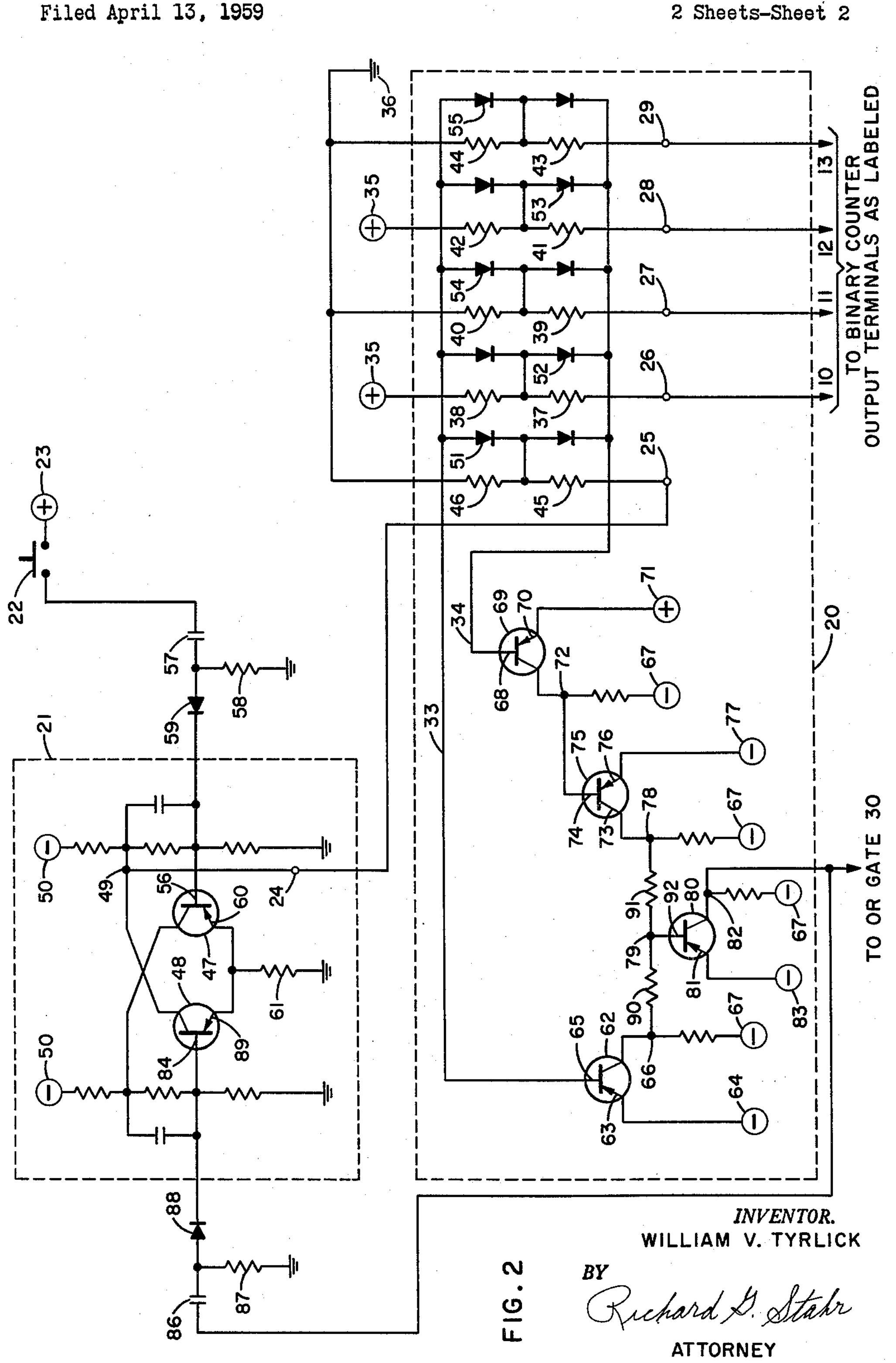

For a better understanding of the present invention, together with further objects, advantages and features thereof, reference is made to the following description in the accompanying drawings, in which:

FIGURE 1 is a schematic block diagram of the non-resetting allotter device of this invention; and, FIGURE 2 is a detailed schematic circuit diagram of the equipment contained within the dashed lines of FIGURE 1.

Without intention or inference of a limitation thereto, the operation of the non-resetting electronic allotter device of this invention will be described relative to an application in the field of communications.

At any given center within a complex communications system, messages may be originated at a plurality of sources within the center for later transmission to a remote location. Since the transmission rate in a modern communication center is much greater than the rate at which messages may be generated by operators, only one transmitter is required to accommodate the combined efforts of many operators originating messages. In systems of this type, each message, as it is being originated, is generally stored upon a recording medium, such as a magnetic drum, where it is retained until the transmitter unit is clear and the message may be sent out. At the completion of a message, the operator is only required to initiate an access signal indicating that the message which he has composed has been completed, is stored in the recording medium and is ready for transmission. At this time, associated allotter switching circuitry becomes active and operates to connect the stored message with the transmitter unit at such time as the transmitter becomes free to receive another message. The non-resetting allotter device of this invention is concerned with the selection of the next one of a plurality of messages which is to be connected individually to a common transmitter circuit in response to the presence of one or more access signals.

Although all of the messages originating in a communications center may be stored in the same storage medium, each originating station will be treated as a separate signal source for purposes of explaining the operation of this invention. To properly identify each of the several originating stations or signal sources, each is assigned a different combination of binary code group representation signals. Generally, each generating station within the communication center is assigned a number and the binary code group representation signals identifying that station may be the binary code designation of that number. To facilitate the description of the operation of the present invention, this system of identification will be assumed to be followed.

The diagram of FIGURE 1 illustrates in block diagram form the equipment involved for the proper operation of the non-resetting alotter device of this invention. The components shown within the dotted rectangle, indicated by reference numeral 5, are required at each of the generating stations or signal sources, while those shown without the rectangle are common to all of the signal sources. While many signal sources may be employed in a communication center, in the interest of drawing simplicity, only four have herein been indicated. As the circuitry within rectangle 5 is identical to the circuitry at every other signal source, the remaining signal sources have been illustrated in block form by reference numerals 1, 2 and 15. Because the recording medium of each of the signal sources is not involved in this invention, they have not been indicated in FIGURE 1.

In the following description of the device of this invention, therefore, it will be assumed that the communications center under consideration has fifteen message originating stations or signal sources and that each is identified by the combination of binary code group representation signals which designates the numerical number assigned thereto. That is, signal source 1 will be identified by the binary code group representation signals designating the numerical digit 1, source 2 will be identified by the binary code group representation signals which designate the digit 2, source 5 will be identified by the binary code group representation signals which designate the numerical digit 5, and so on.

To cyclically produce the binary code group representation signals of the signal sources individually once during each cycle, a conventional four flip-flop binary counter chain driven by a conventional oscillator may be employed. As the detailed circuitry of conventional oscillators and flip-flops are well known in the art and form no part of this invention, they have been illustrated in block form in FIGURE 1 by reference numerals 3, 6, 7, 8 and 9. As is indicated, oscillator 3 is connected to the input terminal of flip-flop 6 through a conventional two input AND gate which, since the details are well known in the art and form no part of this invention, is illustrated in block form in FIGURE 1 by reference numeral 4. Gate 4 is of the type which will produce an output signal only upon the coincident presence of a signal at each of its two input terminals and its significance in the operation of the allotter device of this invention will be detailed later. Each of the flip-flops 6, 7, 8 and 9 of the binary counter is provided with output terminals indicated by reference numerals 10, 11, 12 and 13, respectively. For purposes of illustration only, it will be assumed that the signals appearing at these output circuit terminals will be of either a negative potential or of a ground potential.

At each signal source 1–15 there is included an access signal source for the purpose of producing an access signal in response to the coincident application thereto of an enabling signal and the binary code group signals selected to represent the signal source to which it is common. That is, at such time during the cycle of binary code group representation signals that the binary code group representation signals selected to represent any signal source is coincident with an enabling signal from that source will result in the production of an access signal which indicates that a message originating from that source is ready for transmission. This access signal source is indicated in block form in FIGURE 1 by reference numeral 20 and is detailed in FIGURE 2 where like elements have been given like characters of reference.

Also included in each signal source is a source of enabling signals for the purpose of producing an enabling signal to be applied to the access signal source indicating that a message originating at that signal source is ready for transmission. This enabling signal source may be a conventional flip-flop circuit which, since the details are well known in the art and form no part of this invention, is herein indicated in block form by reference numeral 21. To initiate an enabling signal, push-button 22 is depressed, thereby connecting a source of positive potential 23 to the right input terminal of flip-flop 21. The internal circuitry of flip-flop 21 is arranged in such a manner that upon the depression of button 22, a ground potential signal appears at its output terminal 24 and is applied to input terminal 25 of access signal source 20.

So that the binary code group representation signals produced by the binary counter may be coincidentally applied to the access signal source with the enabling signal, output terminals 10, 11, 12 and 13 thereof are connected to respective input terminals 26, 27, 28 and 29 of access signal source 20. Similarly, output terminals 10, 11, 12 and 13 of the binary counter are connected to the access signal sources of the remaining signal sources in parallel; however, in the interest of reducing drawing complexity these connections have only been labeled in FIGURE 1.

As the details of the operation of enabling signal source 21 and access signal source 20 will be later explained in reference to FIGURES 2 of the drawing, in which like elements have been given like characters of reference, it will be sufficient to say at the present that an access signal will be produced only upon the coincident application to access signal source 20 of an enabling signal from enabling signal source 21 and the binary code representation signals of the numerical digit 5 to respective input terminals 26, 27, 28 and 29.

As this signal is produced, it is applied to one of the input terminals of a conventional OR gate which, since the details form no part of this invention and are well known in the art, is illustrated in block form in FIGURE 1 by reference numeral 30. It is only necessary to point out that OR gate 30 is of a conventioal design which will produce an output signal only upon the presence of a signal at any one or any combination of its several input terminals. The access signal produced by access signal source 20 is also applied to the left input terminal of enabling signal source 21, thereby resetting this flip-flop circuit and removing the enabling signal from access signal source 20.

To provide a circuit which is responsive to the access signal produced by access signal source 20, for the purpose of stopping the action of the binary counter upon the occurrence of an access signal, the access signal conducted through OR gate 30 is applied to the one input terminal of a conventional flip-flop circuit which, since the details form no part of this invention and are well known in the art, is illustrated in block form by reference numeral 31. The output terminal of flip-flop 31 is connected to one of the input terminals of two input AND gate 4 and the internal circuitry of flip-flop 31 is arranged in such a manner that a negative potential signal is normally present at this output terminal but is replaced by a ground potential signal upon the application of an access signal from OR gate 30 to the right input terminal thereof. As the access signal produced by access signal source 20 is applied through OR gate 30 to the right input terminal of flip-flop 31, the negative potential signal present upon its output terminal is replaced by a ground potential signal, thereby destroying the coincidence of signals applied to the respective input terminals of two input AND gate 4. At this time, therefore, AND gate 4 no longer conducts the signals emanating from oscillator 3 to the input terminal of flip-flop 6 of the binary counter chain, thereby stopping its operation. Since the operation of the binary counter chain is stopped at the time it has produced a binary code representation of a signal source which is conditioned to transmit a signal, this binary code representation signal may be taken off its output terminals 10, 11, 12 and 13 and applied to external utilization circuitry, not shown, for the purpose of executing the necessary switching equipment to connect signal source 5 to the common transmitter, not shown. In this manner then, the non-resetting allotter device of this invention selects the next one of a plurality of signal sources to be connected individually to a common utilization circuit by producing the binary code group representation signals peculiar to that source.

As the message emanating from signal source 5 has been transmitted, an end-of-message signal source which, since the details are well known in the art and form no part of this invention, is illustrated in block form in FIGURE 1 by reference numeral 32, applies an end-of-message signal pulse to the left input terminal of flip-flop 31, thereby reversing its state of operation and restoring the negative potential signal at its output terminal. As this negative signal is applied again to one of the input terminals of two input AND gate 4, the signals emanating from oscillator 3 are permitted to pass therethrough and be applied to the input terminal of flip-flop 6 of the counting chain, thereby permitting the cycle of binary code group representation signals to be reinstituted. This cycle will, of course, continue until another access signal is produced within the communication system and applied to the right input terminal of flip-flop 31, at which time the binary counting chain will again be stopped at that number and the binary code representation peculiar to that signal source may again be read from its output terminals 10, 11, 12 and 13.

Referring now to FIGURE 2, there is detailed the enabling signal source and the access signal source which may be used with the device of this invention. It will be noted that the access signal source 20 comprises a pair of buses 33 and 34, which are connected across a series of gate circuits and a chain of transistor devices. For reasons that will be explained later, an access signal will be produced only at such time that both buses 33 and 34 are at a ground potential. Considering the gate portion of this circuit first, it will be noted that are respective input terminals 26, 27, 28 and 29 have been prewired in accordance with the binary code group representation signals which identify signal source 5. That is, a positive signal potential, indicating "mark" polarty bits, is present at input terminals 26 and 28 from potential source 35 through equal series resistor pairs 37, 38 and 41, 42, respectively, corresponding to the first and third bit positions, while a ground potential, indicating "space" polarity bits, is present at input terminals 27 and 29, each being connected to point-of-reference potential 36 through equal series resistor pairs 39, 40 and 43, 44, respectively, which correspond to the second and fourth bit positions, the binary code group representation of the decimal digit 5. Input terminal 25 is also connected to source of reference potential 36 through equal series resistor pair 45, 46. By adjusting the magnitude of the positive potential of source 35 to be a value equal and opposite to the negative potential which appears for the "mark" polarity bits at the respective output terminals of the binary counter, the only time that both buses 33 and 34 can be a ground potential is with the coincident application of a ground potential enabling signal upon input terminal 25 and the application to the remaining input terminals 26 through 29, inclusive, of the binary code group representation signals designating the numerical digit 5. That is, negative potential signals, designating "mark" polarity bits, are applied to input terminals 26 and 28 from binary counter output terminals 10 and 13 and ground potential signals, denoting "space" polarity bits, are applied to input terminals 27 and 29 from binary counter output terminals 11 and 12. Under these conditions only will the potential of the midpoints of all of the series resistor pairs be at ground potential, thereby placing a ground potential on each of buses 33 and 34. With all other combinations, bus 33 will either be at a negative or ground potential, while bus 34 will be at either a positive or ground potential. However, both cannot be at ground potential at the same time with this condition. Considering first the action of the enabling signal, transistor 47 of flip-flop 21 is normally conducting and transistor 48 is normally not conducting. During this period, therefore, point 49 is at a negative potential substantially equal to the supply potential 50 and is applied through output terminal 24 to input terminal 25 of access signal source 20. At this time, the mid-point of series resistor pair 45 and 46 is at a negative potential substantially equal to one-half the magnitude of the negative potential of source 50 in that it is equally divided across a pair of equal series resistances 45, 46, connected between source of negative potential 50 and ground potential 36. Therefore, this negative potential is applied to bus 33 through diode 51 which is poled in a manner to conduct negative potential signals.

Considering now the remaining input circuit terminals 26 through 29, inclusive, the mid-points of the series resistor pairs 37, 38, 39, 40, 41, 42, and 43, 44 will be at ground potential only upon the coincident application of the binary code representation signals designating the numerical digit 5, as previously explained. Since, at this time, a negative potential signal equal and opposite to the positive potential signal of source 35 is applied to input terminals 26 and 28, the center points of series resistor pairs 37, 38 and 41, 42 will be at substantially ground potential in that the equal and opposite potentials are divided across equal series resistances. As ground potential is applied to input terminals 27 and 29, at this time, the mid-points of series resistor pairs 39, 40 and 43, 44 will also be at ground potential in that their opposite ends are also connected to ground at 36. Should a non-coincidence appear at any of these four terminals, a positive potential equal to substantially one-half the magnitude of positive supply source 35 would appear at the mid-points of series resistor pairs 37, 38 or 41, 42 in that the positive potential of source 35 would be divided across equal series resistance pairs and a ground potential in the binary counter. This positive potential would be impressed upon bus 34 through diodes 52 or 53, poled to conduct positive potential signals. Similarly, a negative potential equal to substantially one-half the magnitude of the negative potential of output terminals 11 or 12 of the binary counter would appear at the mid-points of series resistor pairs 39, 40 or 43, 44 in that the negative potential of the binary counter output terminals would be divided across equal series resistor pairs and ground potential at 36. This negative potential would be impressed upon bus 33 through diodes 54 or 55, poled to conduct negative potential signals.

To initiate an enabling signal, button 22 must be depressed for example, thereby connecting a source of positive potential 23 to the base 56 of transistor 47 through a coupling network comprising capacitor 57, resistor 58 and diode 59. As this renders the base 56 of transistor 47 positive in respect to the emitter 60 thereof, a condition which does not satisfy the base-emitter bias requirements for conduction through a type P–N–P transistor, transistor 47 is rendered nonconductive. As this time, through conventional flip-flop action, transistor 48 is rendered conductive. At this time, point 49, which had been at a negative potential substantially equal to the magnitude of the supply potential 50, goes to substantially ground potential, as determined by emitter-resistor 61, thereby placing a substantially ground enabling signal upon input terminal 25 of access signal source 20 from output terminal 24. At this time, therefore, the access signal source is enabled to produce an output access signal at such time during the cycle of production of the binary code group representation signals of the several signal sources that a coincidence occurs. During coincidence, in a manner as previously described, buses 33 and 34 go to substantially ground potential, thereby producing an output access signal which is applied to OR gate 30.

Assuming that both buses 33 and 34 are at ground potential, transistor 62 is nonconductive, in that its emitter 63 is biased negatively from source of negative potential 64 to a magnitude equal to substantially one-third of the maximum negative potential which may appear on bus 33. As the base 65, being at ground potential, is more positive than the emitter 63 of transistor 62, a condition which does not satisfy the base-emitter bias requirements for conduction through a type P-N-P transistor, transistor 65 is nonconductive. Therefore, point 66 is at a negative potential substantially equal to the magnitude of source of supply potential 67. The ground potential of bus 34 is applied to the base 68 of transistor 69. As the emitter 70 of transistor 69 is connected to a source of positive bias potential 71, the magnitude of which is substantially one-third the magnitude of the highest positive potential which will appear on bus 34, the base 68 is negative in respect to the emitter 70, a condition which satisfies the base-emitter bias requirements for conduction through a type P-N-P transistor. As transistor 69 conducts, point 72 goes from a negative potential of a magnitude substantially equal to that of supply potential source 67 to a positive potential substantially equal to that of positive source 71. This positive potential is applied to the base 74 of transistor 75. The emitter 76 of transistor 75 is biased negatively by source 77 to a magnitude substantially equal to the positive potential of source 71. As the base 74 of transistor 75 is at this time positive in respect to the emitter 76 thereof, a condition which does not satisfy the base-emitter bias requirements for conduction through a type P-N-P transistor, transistor 75 is not conducting. With transistor 75 in a state of nonconduction, point 78 is at a negative potential of a magnitude substantially equal to that of supply potential 67. This negative potential is applied through point 79 to the base 92 of normally nonconducting transistor 80, thereby rendering the base 92 thereof negative in respect to the emitter 81 thereof, a condition which satisfies the base-emitter bias requirements for conduction through a type P-N-P transistor. As transistor 80 conducts, point 82 goes from a negative potential substantially equal in magnitude to that of supply potential 67, to substantially the magnitude of the negative potential of source 83. Source 83 supplies a negative bias to the emitter 81 of transistor 80 of a magnitude greater than one-half the negative potential magnitude of source 67. The resulting positive-going pulse present at point 82 is applied to OR gate 30 and to the base 84 of transistor 48 of enabling pulse source 21 through a coupling network comprising capacitor 86, resistor 87 and diode 88. This positive-going pulse renders the base 84 of transistor 48 positive in respect to the emitter 89 thereof, a condition which does not satisfy the base-emitter bias requirements for conduction through a type P-N-P transistor, therefore transistor 48 is turned "off." As transistor 48 is rendered nonconductive, through conventional flip-flop action, transistor 47 is rendered conductive and point 49 goes from a potential substantially equal to ground potential to a negative potential of a magnitude substantially equal to that of source 50. This negative potential is applied through output terminal 24 of enabling pulse source 21 to input terminal 25 of access pulse source 20 and is divided across equal series resistor pair 45 and 46 to point-of-reference potential 36. Therefore, the center point of equal series resistor pair 45 and 46 is at a negative potential substatnially equal to one-half the magnitude of the potential of source 50. This negative potential is applied to bus 33 through diode 51, poled in a manner to conduct negative potential signals, thereby disenabling access signal source 20.

In the absence of an enabling signal pulse from enabling signal pulse source 21, therefore, bus 33 is at a negative potential of a magnitude substantially equal to one-half that of source 50. During this period, even though there is a coincidence of the binary code group representation signals designating the signal source to which access signal source 20 is peculiar, in this instance 5, access signal source 20 will not produce an access signal. During a period of coincidence in the absence of an enabling signal, bus 34 will be at ground potential, for reasons as previously described; however, bus 33 will be at a negative potential. Under these conditions, point 78 will be at a negative potential of a magnitude substantially equal to that of potential source 67, as has previously been explained. The negative bias upon bus 33, however, is applied to the base 65 of transistor 62. As this negative potential is greater in magnitude than that of negative potential source 64 which is applied to the emitter 63 thereof, the base 65 of transistor 62 is biased negatively in respect to the emitter 63, a condition which satisfies the base-emitter bias requirements for conduction through a type P-N-P transistor, therefore transistor 62 is rendered conductive. As transistor 62 conducts, point 66 goes from a negative potential of a magnitude substantially equal to that of source 67 to a negative potential equal to that of source 64 which is designed to be one-third of that of the magnitude of the negative potential of source 67. Therefore, point 79 is of a negative potential of a magnitude substantially equal to one-half of the difference between the potential of point 78 and the potential of point 66 in that it is divided across equal resistors 90 and 91. As negative potential source 83 is designed to be of a magnitude greater than one-half that of negative potential source 67, and since point 79 is at a negative potential less than one-half of the magnitude of that of source 67, the base 92 of transistor 80 is biased positively in respect to emitter 81 thereof, a condition which does not satisfy the base-emitter bias requirements for conduction through a type P-N-P transistor. Therefore, the potential of point 82 remains at a negative magnitude substantially equal to that of supply potential 67, resulting in no access signal produced by access signal source 20.

By similarly tracing through the action of transistors 62, 69, 74 and 80 in access signal source 20, it will be found that no access signal will be produced under the conditions of bus 33 having a negative potential and bus 34 having a positive potential or with bus 34 having a positive potential and bus 33 having a negative potential.

While certain definite polarities have been used in describing this invention, it is to be specifically understood that this is merely a design choice and these polarities may be changed without departing from the spirit of the invention. While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A non-resetting allotter device for use in sequentially indicating individually selected ones of a predetermined number of separate signal sources to be individually coupled with common utilization means, said device comprising separate first means individually forming part of each of said signal sources, each of said first means including first and second groups of corresponding marking conductors and a separate enable marking conductor, selection means for applying a distinctive enable signal marking to said enable marking conductor only in response to the selection of the signal source of which that first means, is part prewired means coupled to said first group of marking conductors to provide thereon a unique code marking identifying that individual first means and the signal source of which it is part, and coincidence means coupled to said enable marking conductor and said first and second groups of marking conductors for deriving a control signal only in response to the simultaneous presence of an enable signal marking and the coincidence of a code marking applied to the corresponding conductors of said second group of marking conductors with said unique code marking applied to said first group of marking conductors, said device further comprising second means including cyclically-operated means coupled in multiple to said second group of marking conductors of all said first means for sequentially applying to said second group of marking conductors each of the respective unique code markings identifying each individual first means and the signal source of which it is part, and switching means coupled to the coincidence means of each first means and to said cyclically-operated means for causing the stoppage of further cyclical operation of said cyclically-operated means in response to said control signal being applied thereto, whereby the unique code marking present on said second group of marking conductors when said cyclically-operated means has been stopped indicates that one particular signal source to be individually coupled to said common utilization means.

2. The device defined in claim 1, wherein said control signal is further applied to said selection means for removing said enable signal marking from said enable marking conductor in response thereto.

3. The device defined in claim 1, further including end of message means for deriving a second control signal in response to a given signal from said one particular signal source, said end of message means being coupled to said switching means for causing the resumption of further cyclical operation of said cyclically-operated means in response to said second control signal being applied thereto.

4. The device defined in claim 1, wherein said prewired means provides on said first group of marking conductors said unique code marking identifying that individual first means and the signal source of which it is part in the form of a unique binary number, wherein said cyclically-operated means includes a pulse counter having a capacity at least equal to said predetermined number for providing an output manifesting the count registered thereby in binary notation, said output of said counter being coupled in multiple to said second groups of marking conductors, a source of sequential pulses, and an AND gate coupled between said source and said counter for normally passing pulses as an input to said counter, and wherein said switching means includes a bistable device having first and second respective stable conditions, an OR gate for individually coupling said coincidence means of each respective first means as an input to said bistable device for switching said bistable device from said first to said second stable condition thereof in response to said control signal from any of said coincidence means being applied thereto, and means for applying an output from said bistable device as an input to said AND gate for rendering said AND gate non-conductive in response to said bistable device having said second stable condition thereof.

5. The device defined in claim 4, further including end of message means for deriving a second control signal in response to a given signal from said one particular signal source, said end of message means being coupled to said bistable device for switching said bistable device back from said second to said first stable condition thereof in response to second control signal being applied thereto.

6. The device defined in claim 1, wherein said selection means includes a bistable device having first and second respective stable conditions, second switching means for switching said bistable device from said first to said second stable condition thereof in response to the momentary operation thereof, means coupling said bistable device to said enable marking conductor for applying said enable signal marking only in response to said bistable device having said second stable condition thereof, and means for coupling said coincidence means to said bistable device to switch said bistable device back from said second to said first stable condition thereof in response to said control signal.

References Cited in the file of this patent

UNITED STATES PATENTS

| | | |
|---|---|---|
| 2,504,999 | McWhirter | Apr. 25, 1950 |
| 2,589,130 | Potter | Mar. 11, 1952 |
| 2,698,382 | Uglow et al. | Dec. 28, 1954 |